UNITED STATES PATENT OFFICE.

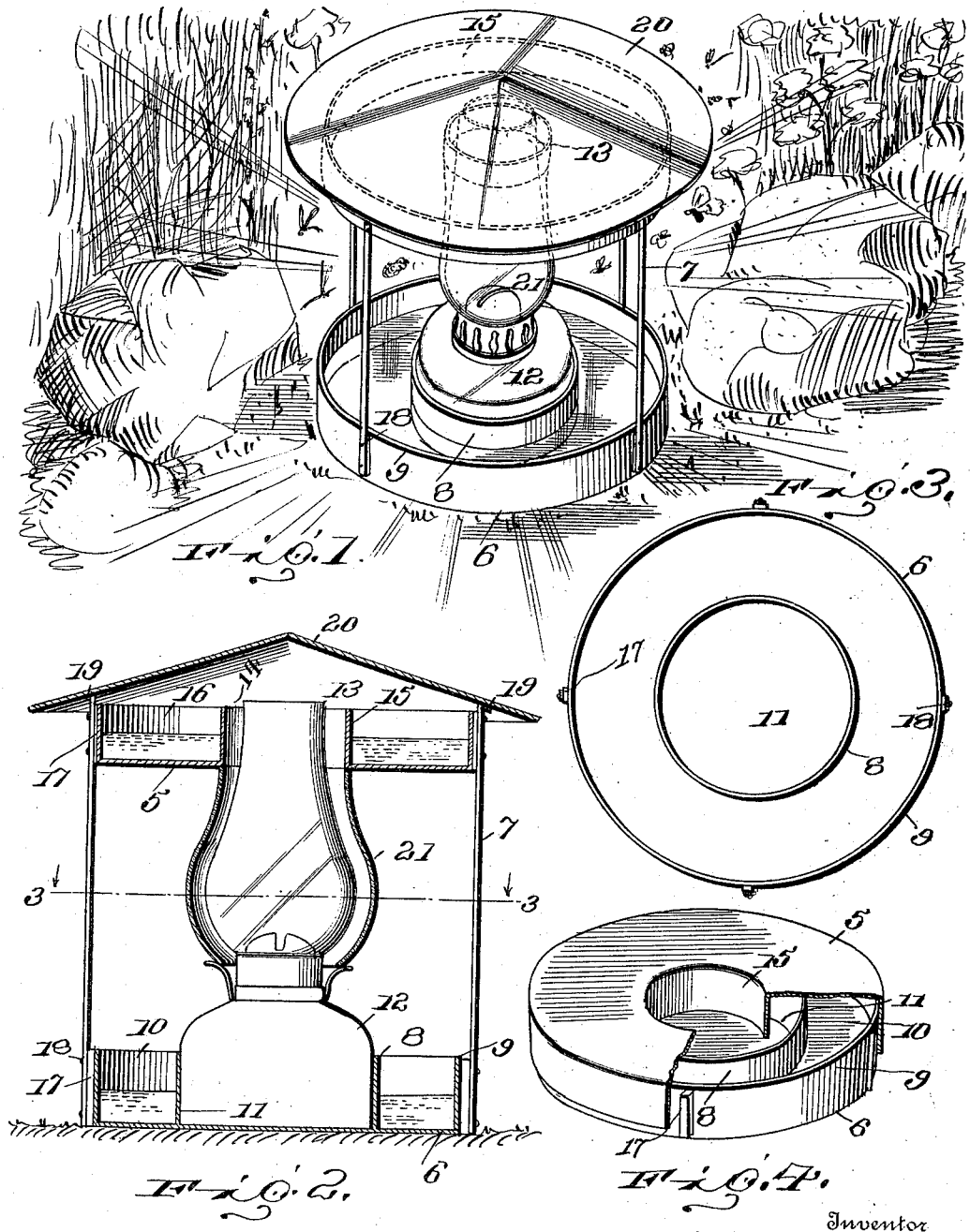

AMBROSE B. BAKER, OF SALEM, OHIO.

FLY-CATCHER FOR LAMPS.

1,019,410.  Specification of Letters Patent.  Patented Mar. 5, 1912.

Application filed July 26, 1911. Serial No. 640,684.

*To all whom it may concern:*

Be it known that I, AMBROSE B. BAKER, citizen of the United States, residing at Salem, in the county of Columbiana and State of Ohio, have invented certain new and useful Improvements in Fly-Catchers for Lamps, of which the following is a specification.

This invention relates to insect traps and has for its object the provision of a comparatively simple and thoroughly efficient device of this character, especially designed for attachment to a lamp and by means of which flies, gnats and other insects, attracted by the light from the lamp may be effectually trapped and destroyed.

A further object of the invention is to provide an insect trap including upper and lower liquid receiving pans, one of which is provided with means for supporting a lamp and the other with an opening to permit the passage of the lamp chimney.

A further object is to provide an insect trap capable of being readily set up for use and quickly knocked down and compactly nested for transportation or storage.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claim.

For a full understanding of the invention and the merits thereof, reference is to be had to the following description and accompanying drawing, in which:

Figure 1 is a perspective view of a fly catcher constructed in accordance with my invention; Fig. 2 is a vertical sectional view of the same; Fig. 3 is a transverse sectional view taken on the line 3—3 of Fig. 2 and looking in the direction of the arrow with the lamp removed; Fig. 4 is a perspective view, showing the manner of nesting the upper and lower pans.

Corresponding and like parts are referred to in the following description and indicated in all the views of the drawings by the same reference characters.

The improved insect trap or catcher forming the subject matter of the present invention comprises upper and lower pans 5 and 6, preferably cylindrical in shape, as shown, and connected by spaced vertically disposed rods 7. The bottom of the lower pan 6 is solid and provided with an upstanding flange 8 spaced from the marginal edge 9 of said pan to form independent chambers 10 and 11, one of which is adapted to receive a quantity of oil, water or other liquid, and the other a lamp, indicated at 12. The lamp 12 is provided with a chimney 13, the upper end of which projects through an opening 14 in the pan 5, there being an upstanding flange 15 surrounding the opening 14 and defining a liquid receiving chamber 16, similar in construction to the liquid receiving chamber in the lower pan 6.

Extending laterally from the marginal edges of the liquid receiving pans, are lugs 17 which bear against the adjacent connecting rod 7, the latter being detachably secured to the lugs 17 by screws or similar fastening devices 18 so that by removing the fastening devices 18, the rods may be readily detached from the pans and the latter conveniently nested for transportation or storage. The upper ends of the rods 7 project above the upper edge of the pan 5 and are provided with laterally extending lips 19 for attachment to the lower face of a conical shaped hood or cover 20.

An outer globe or chimney 21 preferably encircles the inner chimney 13 in order to protect the latter and prevent injury thereto.

In operation, the chambers 10 and 16 are filled with oil or other liquid insecticide, after which the lamp 12 is placed in the chamber 11 of the lower pan and lighted in the usual manner. The flies, gnats and other insects will be attracted by the light from the lamp and deflected downwardly into the liquid in the chambers 10 and 16, thus effectually destroying said insects. It will here be noted that the hood or cover 20 not only forms a deflector for the lamp, but also serves to direct the insects downwardly into the liquid in the upper pan. By releasing the rods 7 and inverting the upper pan 5, the latter may readily be nested in the lower pan, as best shown in Fig. 4 of the drawing.

It will of course be understood that the traps may be made in different sizes and shapes and constructed from any suitable material, without departing from the spirit of the invention.

Having thus described the invention, what is claimed as new is:

An insect trap including upper and lower liquid receiving pans, the lower pan being provided with an upstanding flange and the upper pan with an opening surrounded by a similar flange, and rods forming a detachable connection between said pans, the flange of the upper pan being adapted to fit within the flange of the lower pan when the rods are detached and said pans inverted to permit nesting thereof.

In testimony whereof, I affix my signature in presence of two witnesses.

AMBROSE B. BAKER. [L. S.]

Witnesses:
WILLIAM HENSHILLWOOD,
C. F. KESSELMIN.

Copies of this patent may be obtained for five cents each, by addressing the "Commissioner of Patents. Washington, D. C."